United States Patent [19]
Atkinson

[11] 3,974,248
[45] Aug. 10, 1976

[54] PROFILE DETERMINING AND/OR CONTROLLING SYSTEM

[75] Inventor: Edward Browell Atkinson, Ipswich, England

[73] Assignee: Bakelite Xylonite Limited, London, England

[22] Filed: Sept. 5, 1973

[21] Appl. No.: 394,416

[30] Foreign Application Priority Data
Sept. 8, 1972   United Kingdom............... 41858/72

[52] U.S. Cl................................ 264/40.2; 73/159; 425/141; 425/162
[51] Int. Cl.².......................................... B29D 7/00
[58] Field of Search ............. 264/40; 425/141, 135, 425/140, 162; 73/159; 250/559, 560

[56] References Cited
UNITED STATES PATENTS

| | | |
|---|---|---|
| 3,212,127 | 10/1965 | Flook, Jr. et al. ................... 425/141 |
| 3,307,215 | 3/1967 | Gerhard et al. ..................... 425/141 |
| 3,341,388 | 9/1967 | Bunyea ................................ 264/40 |
| 3,599,288 | 8/1971 | Eakman .............................. 264/40 |
| 3,646,188 | 2/1972 | Campbell ............................ 264/40 |

Primary Examiner—Jan H. Silbaugh
Attorney, Agent, or Firm—Brisebois & Kruger

[57] ABSTRACT

A system for determining and/or controlling the profile of a property of an article, in which sensing means simultaneously obtains a multiplicity of electrical gauging signals, each signal being proportional to a property of the article in a particular region, the gauging signals are passed to electrical circuit means which detect any difference in magnitude between the signals from a given region and the average for all such signals and deriving a functional signal for any such difference.

7 Claims, 6 Drawing Figures

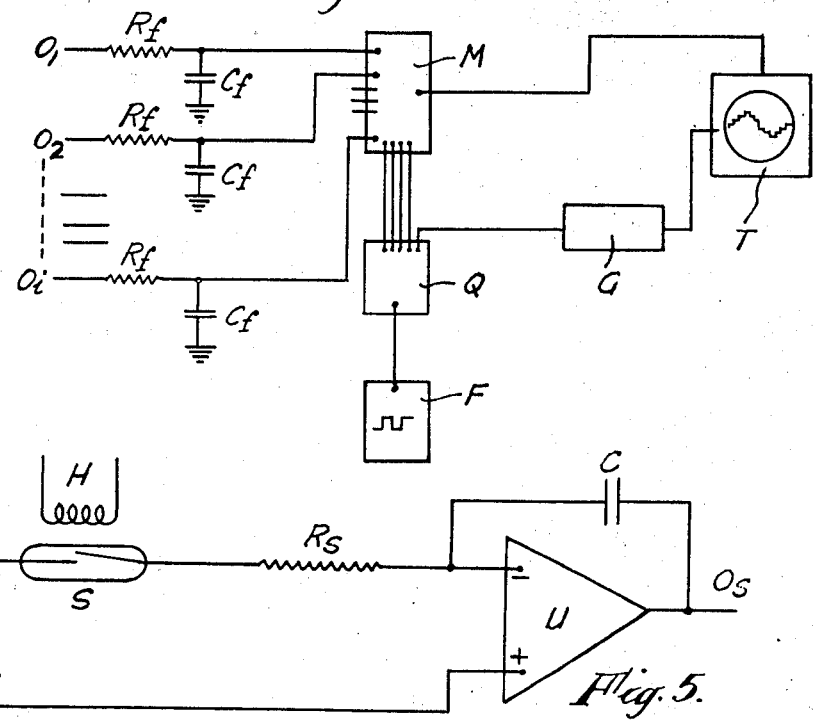
Fig. 4.
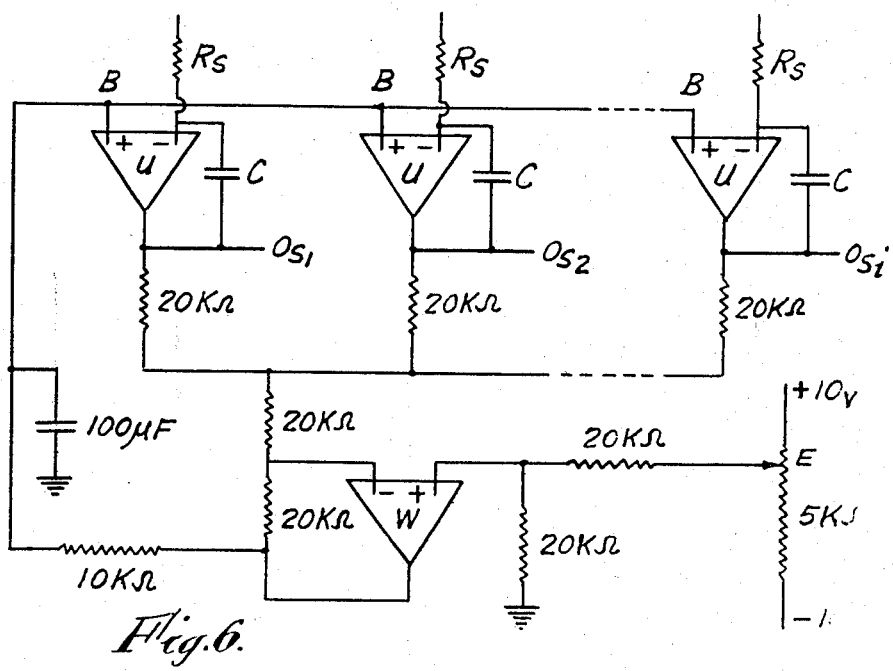
Fig. 5.
Fig. 6.

PROFILE DETERMINING AND/OR CONTROLLING SYSTEM

This invention relates to apparatus for determining the profile of a characteristic or property of an article and to a method employing such apparatus for controlling the profile of a characteristic or property of an article or articles during production.

The apparatus and method of the present invention have been found to be particularly useful in the determination and control of the thickness profile of sheet materials to which, for the purpose of clarity only and not for limiting the scope of the present invention, particular reference is made in the following description.

Continuous sheets and films for example, of organic thermoplastic materials, are manufactured by the use of a variety of processes such as rolling, calendering, extrusion through slot-like extrusion dies and by extrusion of tubes which may be subsequently enlarged in diameter by a captive bubble technique before slitting into sheets. Sheets or films so produced may be subsequently modified in thickness or physical properties by lengthwise, transverse or biaxial stretching, or by shrinking and annealing.

It is usually a desirable object of such processes to produce a sheet or film of uniform thickness, or with a distribution of thickness across its width which conforms to a required profile.

The calendering process lends itself readily to the production of sheet materials with a high degree of uniformity of thickness, the profile of which may be modified by mechanical adjustments of the calendering rolls such as roll bending or skewing of the roll axes. Fine adjustments may be made by grinding the rolls themselves to a suitable profile.

Alternatively, processes in which the primary sheet material is formed by extrusion for example, and particularly when the primary sheet thickness is reduced by stretching processes as is common in the production of packaging films and synthetic paper for example, are likely to produce sheet or film which varies considerably in thickness from place to place along or across the sheet. These variations may arise from changes in the composition, molecular weight or state of plasticisation of the thermoplastic material, from fluctuations in the output of the extrusion machine or local variation in the temperature of the molten material or partly cooled sheet. If the primary sheet produced by extrusion is then subjected to stretching processes to thin the sheet or to produce a state of uniaxial or biaxial orientation, further thickness changes may be produced, for example if the sheet varies in temperature across the width at the time of stretching, or thickness variations already present in the sheet may be magnified. It is therefore often impossible to ensure a uniform thickness distribution across the sheet by a fixed adjustment of the extrusion die gap for example, and desirable to control some significant variables of the process systematically by automatic feed-back control from the observed thickness profile.

The variations in thickness may be distributed in a complex pattern over a sheet produced by an extrusion process for example. The thickness profile at any stage of the process may not always be of the same shape, but may change in a periodic or a random manner. Likewise, the average thickness across the sheet may vary along the length of the sheet in a regular or a random manner.

When the average thickness of the sheet at various positions across the direction of production of the sheet are determined, a persistent, nearly constant, profile may be apparent due to some persistent influence such as the shape of the die gap or a transverse temperature distribution. When a film with a substantial persistent transverse thickness profile is wound into a roll, tight or slack bands appear corresponding to persistently thick or thin bands in the sheet or film. Such reels are unsightly and will generally be difficult to slit because of film wandering or creasing. Also, such reels may cause the film to become distorted with adverse effect on the flat-lying properties of the film.

It is thus desirable to be able to measure the persistent thickness variations across the width of a moving sheet material and, further, to apply corrective measures automatically in order to reduce the persistent variations to a tolerable level. Conventional thickness measuring and controlling apparatus gives difficulty in coping with a situation where both lengthwise and transverse variations of thickness occur simultaneously and where the persistent variations across its width only appear after the thickness at each point across the sheet has been averaged over a considerable length of sheet. To gather sufficient information for control purposes, a thickness gauge having a single measuring head would need to be traversed many times across the sheet. If the response time of the thickness measuring device was such that only relatively low scanning speeds could be used, then the time required to obtain control information may be very long. The result of this would be that corrective action would take place slowly or infrequently and so only relatively poor control could be obtained.

Accordingly, the present invention provides in particular a system for determining, and also for controlling, the persistent transverse thickness profile across a thermoplastic sheet material during its manufacture. Other applications for the apparatus and for the method hereinafter defined will be evident from the subsequent description to those skilled in industrial processing, considered in conjunction with the accompanying drawings in which:

FIG. 4 is the circuit diagram of a display unit for displaying a graphic indication of the thickness profile of the sheet;

FIG. 5 is a circuit diagram of an electrical integrator suitable for use as a signal-conditioning device; and FIG. 6 shows an arrangement in which the integrators illustrated in FIG. 5 are connected to an auxiliary circuit.

According to one aspect of the present invention there is provided apparatus which comprises means to obtain simultaneously a multiplicity of electrical gauging signals the magnitude of each being a substantially linear function, over a working range, of a characteristic or property of an article in a respective region of the article, the slopes of the substantially linear functions having the same sign, means comprising an electrical circuit to accept the gauging signals obtained over the working range, detect any difference in magnitude occurring between each gauging signal and the average of all the gauging signals and derive respective functional signals proportional to each difference such that each functional signal may be correlated with the respective region of the article.

According to a second aspect of the present invention there is provided a method for controlling the profile of a characteristic or property of an article being produced, which method employs the apparatus of the invention and comprises positioning the means such as to obtain simultaneously the multiplicity of electrical gauging signals the magnitude of each being a substantially linear function, over a desired working range, of the characteristic or property of the article in a respective region of the article, the slopes of the substantially linear functions having the same sign, and utilizing each functional signal derived to control a device for adjusting the characteristic or property of the article being produced in the respective region of the article such as to reduce any difference between the respective gauging signal and the average of all the gauging signals.

The article may comprise any material, particularly any solid material, having any form. The invention has been found to be particularly applicable to articles comprising sheets, films, tubes, and moulded articles and particularly where these are produced by continuous or repetitive processes.

The characteristic or property may be any characteristic or property such as for example, temperature, opacity, colour, specific gravity, electrical conductivity, composition and thickness including coating thickness, but it will be appreciated that in the method of the present invention the characteristic or property should be such that it is capable of being influenced by practical means. The invention has been found to be particularly applicable to the determination and/or control of the thickness profile of an article, especially when the article is a sheet or film.

Figure 1:
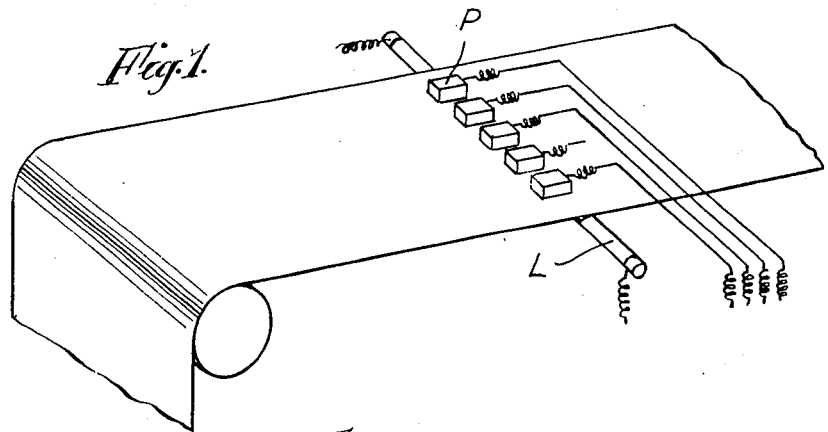
FIG. 1 is a schematic perspective view showing gauging apparatus suitable for use in carrying out the present invention.

The means to obtain simultaneously a multiplicity of electrical gauging signals may be a multiplicity of characteristic or property sensing devices which may be suitably positioned in relation to the article. In the method of the present invention when used to control the characteristic or property profile of an article being produced along a direction, the sensing devices may be advantageously positioned in relation to one another in a direction transverse to the direction of production. The sensing devices may be based upon, for example, the principle of the absorption or scattering of radiation, atomic particles, or electrons, the reflection of micro-waves or the perturbation of electro-magnetic fields by the material of the article. For example, one array of thickness sensing devices which has been found to be suitable for translucent pigmented sheet materials and which will be referrred to hereinafter by way of exemplification only, consists of an electrical fluorescent tube lamp placed behind the sheet material and spanning its width, and a number of photoelectric cells P placed in front of the sheet at intervals across it, along the line of the lamp L as indicated in FIG. 1. In order to obtain a substantially linear response from the photo-cells it is normally necessary, such as in the case of using selenium barrier layer photo-voltaic cells, for example, as are preferred, to connect across each photo-cell a resistor of low value, and which is preferably a variable resistor, such as $R_V$ as described with reference to FIGS. 2 and 3. If variable resistors are used these may be used to adjust the outputs from the photo-cells such that for a desired reference profile the respective gauging signals are all equal. Variable resistors $R_V$ may be used across other types of sensing devices of course, when used, to facilitate matching of the gauging signals in the same way for a desired reference profile. When using photo-cells in the manner described above, optical filters with a peferential transmission for blue and green light, for example, may be placed between the sheet and the photo-electric cells. If the concentration of the light absorbing component in the material of the sheet is substantially uniform, for moderate changes in the thickness of the sheet in the region of a photo-cell the photo-electric current in that cell changes in a substantially linear manner with change in thickness.

Figure 2:
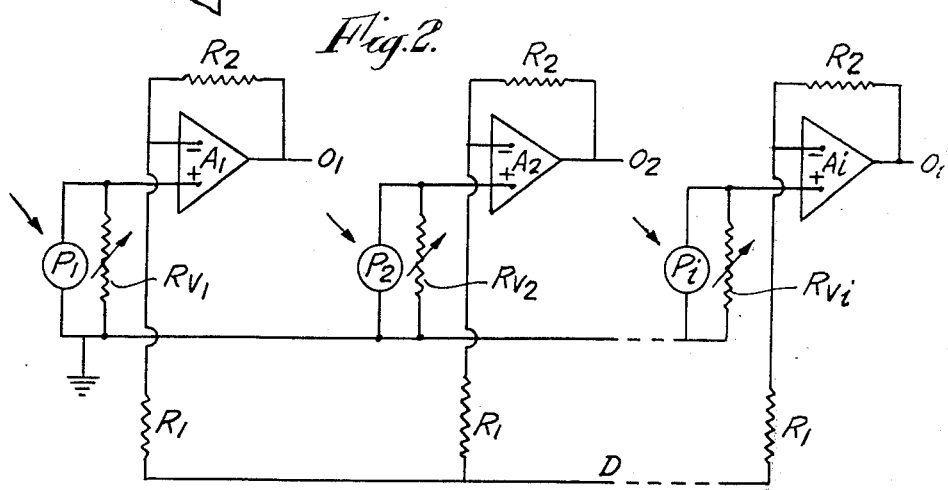
FIG. 2 is the circuit diagram of an electrical system for accepting gauging signals from the apparatus of FIG. 1 and deriving functional signals proportional to any differences between each individual gauging signal and the average of all such signals.
Figure 3:
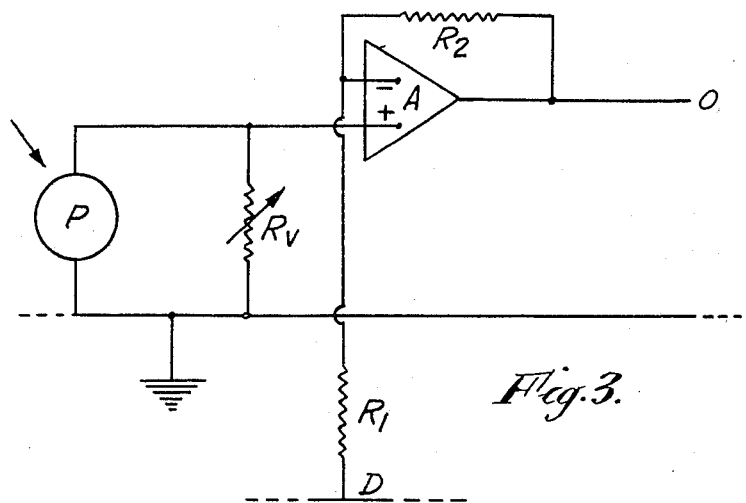
FIG. 3 shows one portion of the circuit of FIG. 2 on an enlarged scale.

The means comprising an electrical circuit to accept the gauging signals, detect any difference in magnitude occuring between each gauging signal and the average of all the gauging signals and derive respective functional signals proportional to each difference is preferably an electrical circuit of the form illustrated in FIG. 2 and which when receiving gauging signals from selenium barrier layer photo-voltaic cells, across which are connected resistors $R_V$, which are preferably variable resistors, as shown, and when incorporating a corresponding number of operational amplifiers, preferably of the monolithic silicon integrated circuit type, may provide electrical signals of magnitude and polarity which makes it particularly suitable for controlling thickness profile display and adjusting devices. FIG. 3 shows one element of the circuit shown in FIG. 2 including photo-voltaic cell P, a variable resistance $R_V$ and an operational amplifier A. In the circuit shown in FIG. 3, light, from a lamp, which is transmitted by a translucent sheet material, for example, falls on the sensitive area of the photo-voltaic cell P and causes th photo-electric current to flow through the variable resistance $R_V$ thus creating a difference in electrical potential between the common earth line and the non-inverting input terminal of the operational amplifier marked with a + sign in the diagram. Provided the value of the resistance $R_V$ is lower than a value which depends upon the size of the photo-voltaic cell and the mean light intensity falling on it, then the voltage across $R_V$, that is the gauging signal, is proportional to the intensity of the light reaching the cell P, for example by transmission through a sheet material, and to the value of the resistance $R_V$. Thus each similar resistance which is combined with the other photo-voltaic cells and amplifiers may be individually adjusted so that the change in voltage across the $R_V$ caused by a change in light intensity may be set to a required value. It is obvious that if the lamp used behind the sheet is not exactly of uniform intensity at all points across the sheet, it will be necessary to adjust each resistance $R_V$ so that if a sheet of uniform thickness and containing a uniform concentration of light absorbing component along the line of the lamp is interposed between the lamp and the photo-voltaic cells, the same voltage across $R_V$ is obtained in each case, that is to say the gauging signals are all equivalent. The resistances $R_1$ have the same value for each amplifier and are typically about $1000\Omega$. The resistances $R_2$ are each of a value which is a fixed multiple of the value of $R_1$, for example 20 or 100 times $R_1$. FIG. 2 shows how the elements as shown in FIG. 3 are interconnected by means of a common bus-bar D to which all the ends of the resistors $R_1$ are connected. It will be seen that $R_1$ and $R_2$ form potential dividing networks between the output of each amplifier and the common bus-bar, the mid-point being connected to the inverting input terminal marked with a negative sign. The amplifiers are supplied from a dual constant voltage Direct Current supply giving positive and negative potentials symmetrical about earth, and conventional zero adjusting controls, not shown in FIGS. 2 and 3, are used to correct the balance of each amplifier so that the outputs $O_1, O_2 \ldots O_i$, which are the respective functional signals, are zero when the potential difference between the two input terminals of each amplifier is zero.

When light shines on the photo-volatic cells and the respective gauging signals comprising voltages $E_1, E_2 \ldots E_i$ generated across the resistors $R_{V_1}, R_{V_2} \ldots R_{V_i}$ are produced, the action of the circuit is such that the bus-bar D takes up a potential $E_C$ with respect to earth potential which is the arithmetic mean of the separate gauging signal potentials $E_1, E_2 \ldots E_i$, and the outputs $O_1, O_2 \ldots O_i$ are given by the expression $$O_i = E_C + \frac{R_1 + R_2}{R_1} \cdot (E_i - E_C)$$

If $R_1$ is much smaller than $R_2$ the second expression on the right-hand side of the equation is large compared with the first. Thus the outputs, that is to say the functional signals, are substantially equal to the difference between the individual values $E_i$ of the potentials across the resistors $R_V$ and the mean potential, amplified by a factor $$\frac{R_1 + R_2}{R_1}$$

In FIG. 2, the polarity of the photo-voltaic cells is such that when illuminated, positive voltages appear at the inverting input terminals of the amplifiers. Thus an increase in the local sheet thickness, by reducing the light intensity at a photo-cell, causes the output voltage of the associated amplifier to become negative with respect to the bus-bar D, and usually negative with respect to the earth line to a degree proportional to the difference of the sheet thickness at the photo-voltaic cell position from the average thickness.

With such a circuit, the output, that is to say the functional signal, from each amplifier is distinct from the output of any of the other amplifiers and therefore may be correlated directly with its associated sensing device, and corresponding region of the article. In such an arrangement for example, the individual output terminals of the amplifiers may be connected to a display device which may give a graphic indication of the persistent thickness profile of the sheet and may consist of a series of electrical low pass filters, one connected to each output, and a switching or multiplexing device which connects the output of each filter in turn to the vertical deflection amplifier of the cathode ray oscilloscope the sequence of the filter output connections being chosen to correspond to the order in which the associated photo-voltaic cells are disposed across the sheet. A diagramatic representation of a display unit of this kind is shown in FIG. 4, in which filter units consisting of resistors $R_f$ and capacitors $C_f$ are situated between the respective outputs $O_1$ to $O_i$ of the amplifiers and a multiplex switch device M.

The multiplex switch device may be a monolithic silicon integrated circuit, the switching sequence being controlled by signals from a binary counter Q fed from a multivibratr F. A saw-tooth waveform generator G is also controlled by the binary counter so that its repetitive period corresponds to a complete switching sequence of the multiplex switch. The multiplex switch connects the capacitors $C_f$ in turn to the vertical deflection amplifier input of the cathode ray oscilloscope T. The horizontal deflection of the electron beam of the cathode ray oscilloscope is derived from the saw-tooth generator G and is synchronised to the switching device so that at any time the horizontal coordinate of the light spot on the screen corresponds to the position across the sheet of the photo-electric cell to which the switching device has connected the oscilloscope vertical amplifier. By this means a magnified thickness profile in the form of a histogram may be displayed on the cathode ray oscilloscope screen. If the "fly-back" trace of the oscilloscope is not blacked out and during the flyback period the switch unit connects the vertical amplifier to the common line D (also preferably through a low pass filter unit,) then the fly-back trace may be used as a reference line for the average thickness, and the position of the main trace above or below this line used to indicate positive or negative thickness deviations from the mean value. A complete switching cycle should preferably take place in less than 0.04 seconds to avoid flickering of the trace.

In addition, or as an alternative, to the above, the functional signals may be fed to, for example thickness adjusting devices. Because there will generally be a time delay between the response of such devices and changes in the sheet thickness reaching the point of measurement, it is normally necessary to interpose signal conditioning devices between the output of each amplifier and the corresponding thickness adjusting device. A typical signal conditioning device which may be used when the thickness adjusting device is an electrical heater for example, is an electrical integrator which may be a circuit such as that shown in FIG. 5.

Each functional signal is preferably fed to its corresponding integrator via a relay such as a dry reed switch S operated by a Solenoid H. The integrator shown in FIG. 5 comprises a resistance $R_s$ connected to the inverting input of an operational amplifier U of very high input resistance such as a field effect transistor input (f.e.t.) operational amplifier. The feed-back capacitor C is connected between the output terminal $O_s$ and the inverting input. The rate of change of output voltage is given by the approximate expression:

$$\frac{dV_{out}}{dt} = -\frac{V_{in}}{R_s C}$$

where Vin is the potential difference between K and B of FIG. 5. B may be connected to the common bus-bar of FIG. 2, or to an auxiliary circuit to be described later. The dry reed switch S is normally held closed by a current passing through the solenoid. Means may thus be provided such that in the event of any interruption of the process or failure of the lamp for example, the current through each solenoid is interrupted causing the switches S to open. Under these conditions the output voltages of the integrators remain unchanged for long periods of time, until production is re-established or the fault cleared. This feature avoids undue delay in re-establishing the appropriate control conditions after the interruption of production.

If K in FIG. 5 is negative in potential with respect to B, such as could occur if the article thickness at the corresponding photo-cell is greater than the average, $O_s$ will become progressively more positive in potential whereas if K is positive with respect to B (the sheet being thinner than average) $O_s$ will become progressively more negative.

If the outputs from the terminals $O_s$ of the integrators are fed to the control circuits of thickness adjusting devices, which are such that a more positive voltage applied to the control circuit produces a decrease in the thickness of the final sheet in a band which is monitored by the corresponding thickness sensing device, it will be obvious that the overall action of the system is to correct the thickness at each band across the sheet towards the average thickness.

It will be appreciated that, the device for adjusting a characteristic or property of an article may take any appropriate form. Thickness adjusting devices may include, for example radiant heating elements which adjust the temperature distribution across a sheet at some point of its passage through a machine, or devices which adjust the temperature or separation of portions of an extrusion nozzle in which a primary sheet is formed, controlled directly, or indirectly for example via conventional control circuits if these are required. Devices of these kinds more often act by causing a redistribution of the thickness of the sheet across its width rather than by altering the thickness at each point independently. Thus an increase in thickness in one band along the sheet caused by a local adjustment in sheet temerature may be accompanied by a general decrease in thickness elsewhere.

If, for example, the potential applied to each integrator was proportional to the difference between the output voltage of the corresponding photo-voltaic cell and a pre-set fixed reference potential, instead of being proportional to the difference between the photo-voltaic cell output and the average of the cell outputs, undesirable effects arise. If the fixed reference potential differs from the average photo-cell output which would be obtained when the thickess variations had been reduced to low values, most of the integrators would still be subjected to a finite input voltage of the same polarity tending to make their outputs increase steadily to high values, or fall steadily to low values. Thus the thickness adjusting devices would be activated progressively until most of them reached the limits of their effective operating range, and thereafter effective control action would be lost.

An advantage of the method of the present invention lies in the fact that the control of the shape of the profile of the characteristic or property across an article, for example, is separate from any control of the average of the characteristic or property of the article. The control of the shape of the thickness profile across a sheet being produced by an extrusion process for example, is separate from any control of the average thickness of the sheet. The average thickness of such a sheet for example, may be controlled by measurement of the potential which appears on the common bus-bar D of FIG. 2, comparing this potential with a pre-set potential and using the difference between these potentials to activate a device to control the average thickness such as a device to control the rotational speed of an extruder screw feeding plastic material to a sheeting die.

Although in sheet manufacture it is usually desirable to achieve sheet with a uniform thickness across it, there are situations in which a controlled but non-uniform thickness profile is required This may be achived quite simply in the system described by adjusting the variable resistances $R_V$ according to a predetermined pattern. An increase in the value of $R_V$ connected to any one photo-cell would result in an increase in thickness of the sheet in the band covered by the photo-cell and its associated thickness adjusting device.

It may, in addition, be of advantage to control the average output potentials of the integrators without alteration of their relative values, for example to ensure that the thickness adjusting devices are operated over the most effective part of their range of control. This may be accomplished by a circuit such as that shown in FIG. 6 in which the integrators illustrated by FIG. 5 are connected to an auxiliary circuit.

In the circuit of FIG. 6 the terminals B of the integrators, instead of being connected to the bus-bar D, are controlled at a potential determined by the difference between the average output potential of the integrators and a fixed reference potential derived from a potentiometer E. The amplifier W may be of the same type as the amplifiers A in FIGS. 2 and 3.

In order to obtain a smooth control action for the whole system which is free from hunting but is not sluggish in response, the control parameters of the system must be optimised in a manner which is well known to those skilled in the art.

The values of $R_s$ and C in FIG. 5 and particularly the values of the product $R_s \times C$ must be chosen so that the speed of response of the thickness adjusting device occasioned by a departure of the article thickness from the mean value at any photo-voltaic cell position is of an optimum value. The optimum speed of response will be lower if longer time delays occur between passage of a portion of the sheet, for example, past the thickness adjusting devices and its arrival at the thickness measuring stations.

The following Examples are given to illustrate the present invention but to in no way limit the scope thereof:

EXAMPLE 1

An apparatus as described and illustrated with reference to FIGS. 1 to 4 was constructed to include 13 photo-voltaic cells P and their associated amplifiers $A_1$, $A_2 \ldots A_{13}$. The photo-voltaic cells were selenium barrier layer cells each of sensitive area 15 × 30 mm, and were enclosed in a light-tight box with apertures disposed such that light transmitted by a translucent sheet material from a day-light type, 40 Watt, 4 foot long fluorescent lamp fell upon the sensitive area of each cell. Blue-green filters were placed immediately in front of each photo-voltaic cell. The sensing photo-cells and the corresponding apertures were separated at 3 inch intervals across the path of the sheet. The construction of the box and lamp housing was such as to reduce to small values any photo-current in any cell caused by light other than that transmitted by the translucent sheet material immediately below that cell. The amplifiers $A_1, A_2 \ldots A_{13}$ were of type 709 monolithic silicon operational amplifiers of an open loop power gain of 90 decibels, each being balanced to less than 0.5 mV referred to the input circuit. $R_2$ was 100,000Ω and $R_1$ 1000Ω in each case. $R_{V_1}, R_{V_2} \ldots R_{V_{13}}$ were adjusted so that with a uniform 4/1000 inch sheet of a translucent polyethylene film containing titanium dioxide and of average diffuse light transmission for green light of 11%, the potential difference across each was the same and equal to 90 millivolts. The capacitors $C_f$ in FIG. 4 were of 2 microfarads capacitance, and of high leakage resistance and the resistors $R_f$ were mounted in plug-in units enabling them to be changed readily. M was a solid state multiplex switch of type DG506 supplied by Siliconix Ltd. F was a multi-vibrator with an output frequency of 400 cycles per second. G and T were conventional units as described with reference to FIG. 4 and Q was a T.T.L. (Transistor - Transistor Logic) 4-Bit Binary Counter Type FJJ 211 as supplied by Mullard Ltd.

The apparatus was used to monitor thickness variations on a sheet material 48 inches wide during production by an extrusion operation, the sheet being of 4/1000 inch average thickness and consisting of high density polyethylene containing fillers and pigments such that its average light transmission for green light was approximately 11%.

A trace was formed on the oscilloscope screen which clearly indicated deviations of thickness across the sheet, when the resistors $R_f$ were each of 1 Megohm resistance, short period variations in thickness along and across the sheet were readily observed and these observations were of use in tracing the origin of the transient thickness variations. When the resistors $R_f$ were replaced by resistors of 10 Megohm values, the short period variations were smoothed out and a persistent profile of sheet thickness was observed, enabling corrective actions to be taken to reduce the differences in average thickness across the sheet.

EXAMPLE 2

The apparatus as described in Example 1 was modified by the addition of a set of 13 integrators, each as illustrated in FIG. 5 and in which C was a 2μF capacitor of leakage resistance greater than 20,000 Megohms and $R_s$ was of 20 Megohms resistance. The f.e.t. operational amplifier U was of type E78 as supplied by Computing Techniques Ltd. The integrators were connected together in a circuit as described with reference to, and as illustrated in FIG. 6 in which the amplifier W was of the same type as the amplifiers A described in Example 1. The free terminals of the resistors $R_s$ were connected respectively, via switches s, not shown in FIG. 6, to receive the functional signals $O_1, O_2 \ldots O_{13}$.

With the resistors $R_V$ adjusted as described in Example 1 and the switches S closed, the outputs $O_{s_1}, O_{s_2} \ldots O_{s_{13}}$ were used to adjust the outputs of conventional power control circuits which supplied electrical power respectively to 13 radiant heaters. The potentiometer E was adjusted such that the total heating effect of the heaters at any time was approximately 30% of their total maximum rated value.

The heaters were disposed across a continuous plastic sheet which was otherwise heated to an extensible condition prior to entering a continuous simultaneous biaxial stretching machine. The photo-voltaic cells and the lamp of Example 1 were disposed on opposite sides of the stretched sheet, having a nominal average thickness of 4/1000 inch and consisting of high density polyethylene containing fillers and pigments such that its average light transmission for green light was approximately 11%, at a position beyond the exit of the machine and before the wind-up unit. The position of the heaters was such that an element of the in-going sheet material passing under a particular heater would subsequently pass between the lamp and the photo-voltaic cell which actuated the control channel controlling the radiant heating power of that particular heater. The distance between respective photo-voltaic cells and their corresponding heaters was such that the time it would take for an element of sheet to pass between them was approximately 1 minute.

The biaxial stretching machine was started without initially energising the radiant heaters and the stretched sheet material was found to vary persistently in thickness across the width, the maximum thickness deviation being ± 10% of the average thickness. When the heaters were energised in a pattern of intensities controlled by the apparatus described, the maximum thickness deviation was seen to diminish to ± 2½% of the average thickness.

The apparatus and method of the invention has been described with particular reference to the determination and control of the thickness profile of a thermoplastic sheet during continuous production and to the use of correspondingly suitable apparatus components but it will be obvious that the apparatus and method may be adapted and employed in many different ways to determine and control the profile of any characteristic or property of an article. The apparatus for example may be adpated to determine characteristic or property profiles such as the thickness profiles of the walls of tubes, bottles and a variety of articles. Such use of the apparatus of the invention may assist the manual control of processes by which the profile is obtained. The method of the invention may be adapted to control automatically a characteristic or property profile of any article produced by a continuous or repetitive process, and particularly a characteristic or property profile in a direction transverse to the direction of production of such an article or articles. An example of a repetitive process is the injection moulding of hollow articles where a deviation of the thickness, for example, of an article wall from the average may be determined and the appropriate automatic adjustment of the die components effected before the next moulding operation takes place. Clearly, applications will not be limited to the plastics industry and the apparatus and method of the invention may find applications in the paper, glass or steel industries for example.

What is claimed is:

1. A method for controlling the profile of a characteristic of an article, which comprises the steps of measuring said characteristic by means of a plurality of individual sensing means, simultaneously producing an individual electrical gauging signal for each sensing means determining the average of all said individual signals, the magnitude of each individual signal being a substantially linear function at least over a working range of the characteristic at a particular region of the article, the slopes of all the substantially linear functions having the same sign, detecting any difference in magnitude occurring between each individual signal and said average of all said signals, electrically deriving directly from said difference a functional signal for any such difference which is correlated with the region of the article from which it is derived and utilizing each functional signal to control a device for adjusting said characteristic of at least one article subsequently produced in the same run of an article producing apparatus in any region for which a functional signal is produced so as to reduce any difference between the gauging signal from that region and the average of all the gauging signals.

2. A method as claimed in claim 1 in which the article is a sheet, film, tube or moulded article.

3. A method according to claim 1 wherein the electrical gauging signals are fed separately to the non-inverting input terminals of separate operational amplifiers, the negative feed-back resistive divider circuits of said amplifiers being connected to one point, such that the functional output signals from each amplifier are proportional to the difference between the magnitude of the gauging signal fed to each amplifier and the average magnitude of the signals fed to all of the amplifiers.

4. A method according to claim 1, wherein the articles are produced by a continuous method or a repetitive method.

5. A method according to claim 1, wherein the characteristic or property of the article is temperature, opacity, colour, specific gravity, electrical conductivity, composition or thickness.

6. A method according to claim 1, wherein the article is a sheet or film and the characteristic or property to be controlled is the thickness thereof.

7. Apparatus for controlling the profile of a characteristic of an article, said apparatus comprising a plurality of individual sensing means for measuring said characteristic, means for simultaneously producing an individual gauging signal for each sensing means, and means for determining the average of all said individual signals, the magnitude of each individual signal being a substantially linear function, at least over a working range, of said characteristic at a particular region of the article with the slopes of all the substantially linear functions having the same sign, means for detecting any difference in magnitude between each individual signal and said average of all said signals, means for electrically deriving directly from said difference a functional signal for any such difference which is correlated with the region of the article from which it is derived, and means for utilizing each functional signal to control a device for adjusting the characteristic of the article or articles subsequently produced in the same run of an article producing apparatus in any region of the article for which a functional signal is produced so as to reduce any difference between the gauging signal from that region and the average of all the gauging signals.

* * * * *